(12) United States Patent
Wang et al.

(10) Patent No.: US 9,639,349 B2
(45) Date of Patent: *May 2, 2017

(54) SUBJECT AND AUDIENCE ORIENTED INSTANT COLLABORATIVE DEVELOPMENT

(71) Applicant: EMC Corporation, Hopkinton, MA (US)

(72) Inventors: Bin Wang, Beijing (CN); Jiang Wu, Beijing (CN); Leng Han, Beijing (CN); Ning Fu, Beijing (CN); Lei Feng, Beijing (CN)

(73) Assignee: EMC IP Holding Co., LLC, Hopkinton, MA (US)

(*) Notice: Subject to any disclaimer, the term of this patent is extended or adjusted under 35 U.S.C. 154(b) by 19 days.

This patent is subject to a terminal disclaimer.

(21) Appl. No.: 14/734,339

(22) Filed: Jun. 9, 2015

(65) Prior Publication Data

US 2015/0268951 A1  Sep. 24, 2015

Related U.S. Application Data

(63) Continuation of application No. 13/631,047, filed on Sep. 28, 2012, now Pat. No. 9,104,995.

(51) Int. Cl.
*G06F 9/44* (2006.01)
*G06Q 10/06* (2012.01)
*H04L 12/58* (2006.01)
*H04L 29/06* (2006.01)
*G06Q 10/10* (2012.01)

(52) U.S. Cl.
CPC .............. *G06F 8/70* (2013.01); *G06Q 10/06* (2013.01); *G06Q 10/103* (2013.01); *H04L 51/00* (2013.01); *H04L 65/403* (2013.01)

(58) Field of Classification Search
None
See application file for complete search history.

(56) References Cited

U.S. PATENT DOCUMENTS

| | | | |
|---|---|---|---|
| 8,407,670 B2* | 3/2013 | Hegde ...................... | G06F 8/71 717/122 |
| 2013/0080997 A1* | 3/2013 | Dattathreya .............. | G06F 8/71 717/121 |
| 2015/0046904 A1* | 2/2015 | Rummler .................. | G06F 8/71 717/122 |

* cited by examiner

*Primary Examiner* — Craig Dorais
(74) *Attorney, Agent, or Firm* — Barry N. Young

(57) ABSTRACT

Techniques to facilitate software development are disclosed. In various embodiments, an indication is received that a software development project event has occurred. One or more rules are applied to determine one of more of a notification to be sent in response to the event, a recipient to receive the notification, and a communication channel to be used to send the communication. The notification is generated and sent to the recipient via the communication channel.

21 Claims, 6 Drawing Sheets

```
Owner:      Wang
From Tool:  GitHub
Receive:    @Author, @CommitMessage, @ChangeList
Pattern : [
{Name : servicedoc
Condition = exist "servicedoc/wadl" in @CommitMessage
Action: [
  { Channel : [Twitter, Email]
    Message : "@Author checked in the code link_extractor(@ChangeList)"
    Receiver : [Dev_Zhang, Dev_Liu]
  },
  { Channel : [Twitter, SMS]
    Message : "@Author finish the story story_extractor(@CommitMessage)"
    Receiver : [PM_LI, PM_LIU]
  }
]
}
]
```

SUBJECT AND AUDIENCE ORIENTED INSTANT COLLABORATIVE DEVELOPMENT

CROSS REFERENCE TO OTHER APPLICATIONS

This application is a continuation of co-pending U.S. patent application Ser. No. 13/631,047, entitled SUBJECT AND AUDIENCE ORIENTED INSTANT COLLABORATIVE DEVELOPMENT filed Sep. 28, 2012 which is incorporated herein by reference for all purposes.

BACKGROUND OF THE INVENTION

Engineers and managers involved in major software development projects may be based in different areas all over the world, spanning many time zones. In addition, the language used by different members and/or teams involved in a project, and the relevance and significance of certain actions and milestones being accomplished (or not) may differ between different members of the team, and between different participants having different roles, such as software developers, product managers, quality assurance engineers, etc. The sheer volume of messages may tend to overwhelm recipients and may result in the importance of a particular communication not being recognized by a recipient. These factors present many challenges with respect to the timely and effective dissemination and consumption of relevant information.

Various tools may be used in a software development project. Examples include without limitation communication tools (Email, IM, etc.); project management tools (JIRA, Pivotal Tracker, etc.); code repositories (P4, SVN, Github, e.g.); code review tools (e.g., Fisheye); test and test case management tools (e.g., TestRail); and release engineering tools (e.g., Pulse, Hudson, FeedbackCentral). Typically, these tools have limited notification functionality, and typically teams only use such functionality to generate communications to be sent by email, due to limitations on the ability to integrate the notification and communication functionalities of the various tools being used and also security considerations. In addition, receipt of email may require connectivity to a particular network and/or in a particular way, such as VPN, which may not be available at all times, resulting in less timely delivery and receipt of information.

BRIEF DESCRIPTION OF THE DRAWINGS

Various embodiments of the invention are disclosed in the following detailed description and the accompanying drawings.

FIG. 3 is a block diagram illustrating an example of a notification rule.

DETAILED DESCRIPTION

Figure 1:
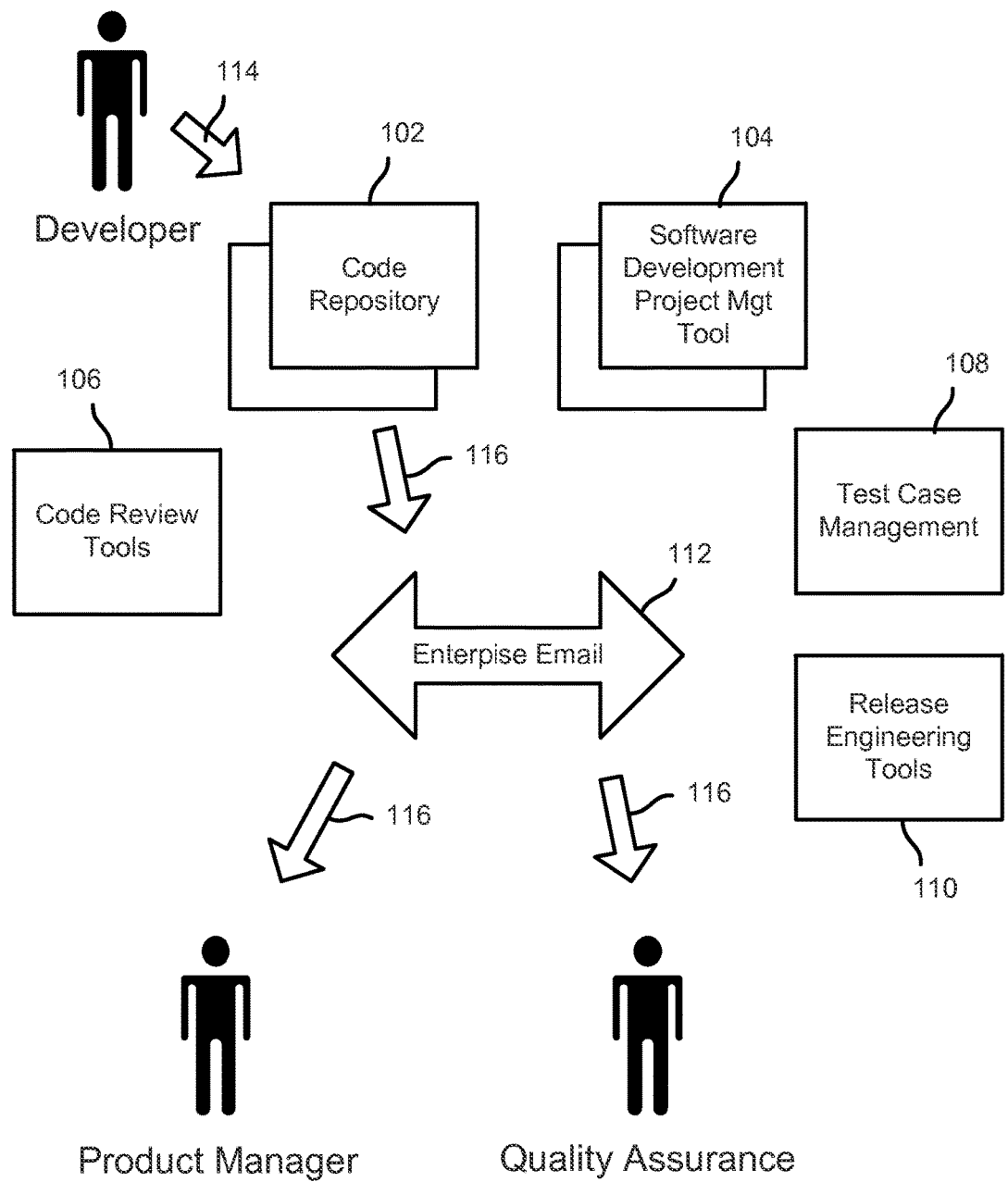
FIG. 1 is a block diagram illustrating an embodiment of a typical software development environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Subject and audience oriented instant communication in a software development environment is disclosed. In various embodiments, tools and other automated entities used in a software development project generate notifications as actions are performed, for example in response to software code being checked in to a repository. The notification messages are sent to a notification center. The notification center parses received notification messages and extracts attributes. Based on the attributes, such as the subject of the notification (e.g., which part of the software), the sender, intended recipients identified in the notification, etc., applicable communication rules are found and associated actions performed. The rules defined may include, without limitation, rules that specify the extraction method, recipients, and a corresponding message template for each recipient or group. For example, one or more notification messages may be generated and sent to one or more recipients, using for each one or more channels identified in the rule to be used to communicate the notification to the recipient, potentially with different content and/or context data for each recipient. In some embodiments, an agent may be used to communicate, for example via an API or other interface, with other automated elements used in the software development project, for example to cause such other entities to record information and/or take other actions.

FIG. 1 is a block diagram illustrating an embodiment of a typical software development environment. In the example shown, software developers are assigned to write or modify code for various component parts of an overall software development project. For example, software functional requirements, engineering/design specifications, and other documents may be prepared to define a project's requirements and design, and software developers and/or development teams are assigned to write software code to implement and/or integrate various aspects of the overall project. In certain approaches, a user "story" may be defined, for example by a product manager, to identify and describe attributes of expected end users of the software under development (differentiated, for example, by user role), how they will use the software, and what they will need and expect the software to do and/or enable them to achieve. A product manager may relate to a software development project and the component elements thereof more in terms of how a particular component relates to one or more user stories, and how those stories fit in the overall story or vision for the software. By contrast, software engineers engage in development may be focused more on the architecture and component pieces of the software code being written to realize the user story. As such, to a software developer the "change list" or other reported data that reflects software elements affected by an action by a software developer on the team, for example the "commit" of a new or modified set of code to a code repository or other system being used to store and manage source code, may be more useful and relevant.

In the example shown in FIG. 1, for example, a software developer is shown committing a software code 114 to a code repository (or other source code control and/or revision tracking system) 102. Other elements of the software development environment shown in FIG. 1 include one or more software development project management tools 104, code review tools 106, test case management tool 108, and release engineering tools 110. In the example shown, the development tools 102, 104, 106, 108, and 110 have access to and are configured to use the enterprise email system 112 to send notification messages to software development team members, for example as events the systems are configured to provide such notifications in response to are determined to have occurred. In the example shown in FIG. 1, in response to the software developer committing the software code 114 to code repository 102, the code repository generates and sends to a product manager and a quality assurance team member the same email message 116, originated by the code repository 102 and address to the product manager and quality assurance team member using their respective email addresses.

In the approach shown in FIG. 1, which is typical of prior art environments, team members receive the same information regardless of their role and expertise, and regardless of the relevance of the information to them, if at all, and the significance of the information to them, in terms for example of how important the particular information is to them, given their role on the team, and/or what they might be required to do in response to the information. For instance, in the example shown in FIG. 1, both the product manager and the quality assurance engineer typically would receive the same email. Since in this example the email 116 originated from a code repository 102 in response to a commit of new or changed software code 114, the email likely would identify the action in terms of a "change list" of the software components affected by the commit. This information may not be recognized by the product manager, for example, as being highly relevant to a certain part of the user "story" in which the product manager has great interest. On the other hand, while change list information may be more useful and intelligible to the quality assurance engineer, and if noticed might trigger action by the quality assurance engineer to begin testing of the code 114, if the email 116 were buried in a large volume of email messages most of which are not relevant to the quality assurance engineer, and that do not require the quality assurance engineer to act in response, then the message and/or its relevance might be missed by the quality assurance engineer.

Figure 2:
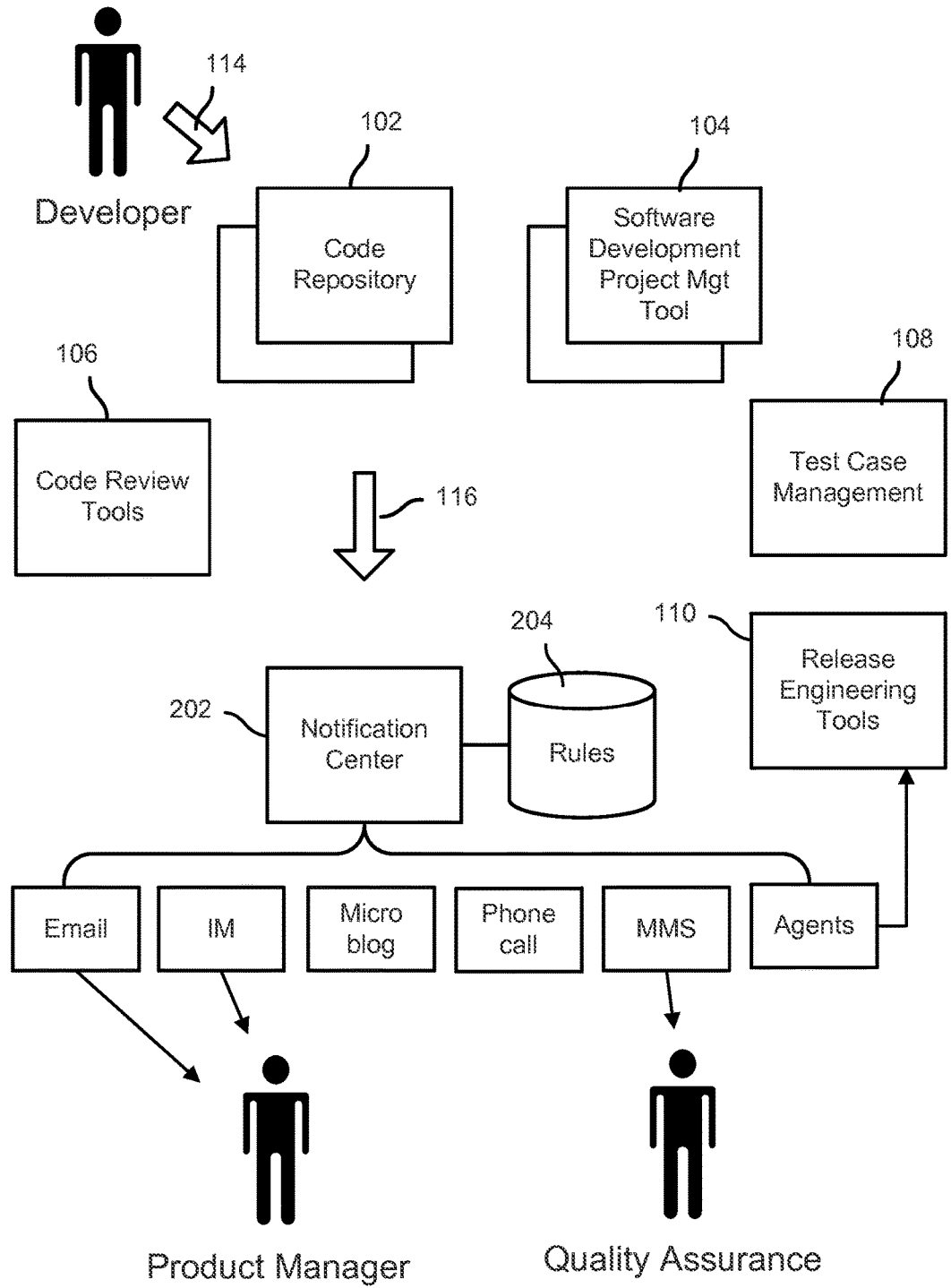
FIG. 2 is a block diagram illustrating an embodiment of a software development environment comprising a notification center to provide rule-based audience and subject based communications.

FIG. 2 is a block diagram illustrating an embodiment of a software development environment comprising a notification center to provide rule-based audience and subject based communications. Use of a centralized notification center to provide rule-based notification, in various embodiments based at least in part on audience/recipient and/or subject matter, is disclosed. In the example shown in FIG. 2, software development tools are configured to provide notifications to a notification center 202. The notification center 202 is configured to apply a set of rules 204 to determine and take actions in response to notifications it receives. For example, in the example shown in FIG. 2, the notification center 202 receives the email 116 generated by the code repository 102, in response to the action by a developer to commit a software code 114 to the code repository 102. In various embodiments, the notification center includes components to parse the received email 116 and extract one or more attributes. The attributes are provide to a rule engine, for example they are asserted as "facts" to the rule engine, which determines which rules in rules 204 are triggered and for each triggered rules which action(s) is/are required. The notification center 202 performs the action(s) indicated by the applicable rule(s) 204, such as by generating and sending via one or more indicated channels, to one or more indicated or otherwise determined recipients, one or more communications containing and/or based at least in part on information included in and extracted from the original email 116.

In various embodiments, examples of rules 204 include without limitation rules that may be triggered by the identity of the user who performed the action that caused the email 116 to be generated; an identifier or other data included in the email 116, for example one associated with the code 114 and/or a story or other element with which the code 114 is associated, such as a change list or story identifier; and an explicitly named intended recipient of the email 116. For example, for a component affected by the committed code 114 and/or identified explicitly in a change list or other data provided explicitly in connection with the commit, the code repository 102 may be configured to perform a lookup to identify one or more recipients to whom the change list should be provided via email 116. Notification center 202 may be configured to extract the recipient names (or other identifiers) and the change list data from the email 116; recognize that one of the intended recipients is a product manager; and perform a lookup to map the change list to one or more story identifiers. Rules in rule store 204 may indicate that for the product manager recipient the story identifier should be included in a communication sent by email and instant message (IM), as in the example shown, while the change list and/or other data should be sent to the designate quality assurance team recipient via text or other MMS message.

In various embodiments, one or more of the recipient(s), channel(s), and/or content of notification messages to be sent by notification center 202 in response to a message (for example email) received from one or more of the elements of the software development environment may be determined automatically by the notification center 202, for example by a performing a lookup at or by the notification center 202 and/or by using data included in or derived from the notification message received at notification center 202 to apply one or more rules 204 an associated action of which includes, provides, or causes retrieval of the required information. For example, in some embodiments, the notification center 202 may perform a lookup based on the identity of an intended recipient to determine one or more channels to be used to communicate with that recipient, for example based on stored user preference data associated with that user. In some embodiments, a superset of communication channels indicated by the originating user (e.g., the developer in this example) and the respective recipient(s), e.g., the product manager and quality assurance engineer in the example in FIG. 2, may be used. For example, if the developer indicated the product manager should be notified by email but the product manager had indicated previously a preference to be notified by instant message (IM), then both channels would be used, as in the example shown in FIG. 2.

In the example shown in FIG. 2, available notification channels include email, instant message, micro blogs (e.g., Twitter™), a voice or other phone call, text or other MMS messages, and one or more agents configured to provide a notification to other elements of the software development environment, for example via an API or other machine interface of such elements. In some embodiments, a pluggable communication channel architecture is used to enable new or different notification channels to be configured for and/or added to the notification center 202. For example, a plug in, agent, or other intermediary entity may be installed and/or configured at notification center 202 to connect the notification center 202 to the communication channel and/or to configure the notification center 202 to provide messages in a form and/or manner required to communicate with intended recipients via the communication channel.

In the example shown in FIG. 2, in addition to the notifications sent to the product manager (email, IM) and quality assurance team member (MMS), the notification center 202 uses an agent to send a notification to release engineering tools 110, for example to cause a tool to generate or update an associated installation tool with which the code 114 is associated and/or to cause an associated comment or other information to be generated and stored. In various embodiments, one or more target element-specific agents may be provided to enable machine-to-machine notifications to be sent to associated elements of the software development environment. Receiving elements may be configured to perform actions in response to receiving such notifications, such as to record comments or other information, initiate or unblock workflows, send further or responsive notifications to notification center 202 once actions have been triggered at and/or performed by the receiving element (potentially triggering further notifications by notification center 202), etc.

In various embodiments, the notification center 202 includes a user database and an administrative interface used to provide user identity and preference information. For example, individual users may register with the notification center, including by providing contact information and setting communication preferences. In some embodiments, the notification center 202 has access to an Enterprise Identity Management System or other system that enables the user to easily access the notification center and configure the rules the user desires.

FIG. 3 is a block diagram illustrating an example of a notification rule. In the example shown, the first lines of rule definition 302 identify the owner of the rule and a software development tool with which the rule is associated, in this example the code repository "GitHub™". The fields of data to be extracted from messages received from the code repository are identified as "@Author", "@CommitMessage", and "@ChangeList", indicating in some embodiments that notifications received from GitHub™ should be parsed to extract the author, commit message, and change list information. A set of one or more patterns is defined to enable incoming notifications that satisfy the conditions of the rule to be identified programmatically. Action(s) to be taken in the event the condition(s) is/are met are defined. In this example, a first action is to send notifications by Twitter and by email, to developers named "Zhang" and "Liu", with content indicating that the extracted author checked in the code and contains the committed code URL links which extracted from change list, which is to be included in the notifications. A second action is to send Twitter and SMS notifications, indicating the author finished the "story" extracted from the commit message, to product managers named "Li" and "Liu". In various embodiments, the recipients are registered in the notification system in advance, so the notification center has access to their correct contact information such as cell phone, twitter ID, etc. This example illustrates the degree of control the user who defines the rule can exercise, in various embodiments, over who receives notifications, via which channel(s), and the specific content of the notifications received by each.

Figure 4:
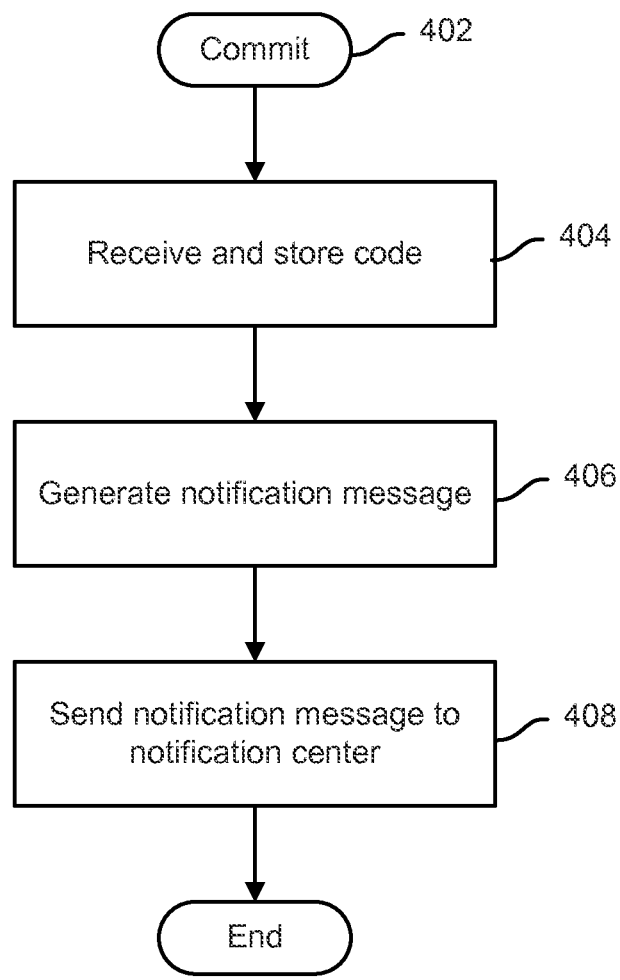
FIG. 4 is a flow chart illustrating an embodiment of a process to generate notification messages.

FIG. 4 is a flow chart illustrating an embodiment of a process to generate notification messages. In various embodiments, the process of FIG. 4 may be implemented on elements of a software development environment, such as code repository 102 of FIG. 1. In the example shown, upon receiving a "commit" action (402), for example of specific software code, the receiving element receives and stores the associated code (404), generates a notification message (406), and send the notification message to a notification center (408), such as notification center 202 of FIG. 2. In various embodiments, the software development environment element may include or provide an administrative or other interface that enables the element to be configured to send notifications to or via the notification center and/or to include in such notifications information that may be required, and/or in a form or format required, to enable the notification center to parse the notification programmatically, and to extract desired attributes therefrom programmatically.

Figure 5:
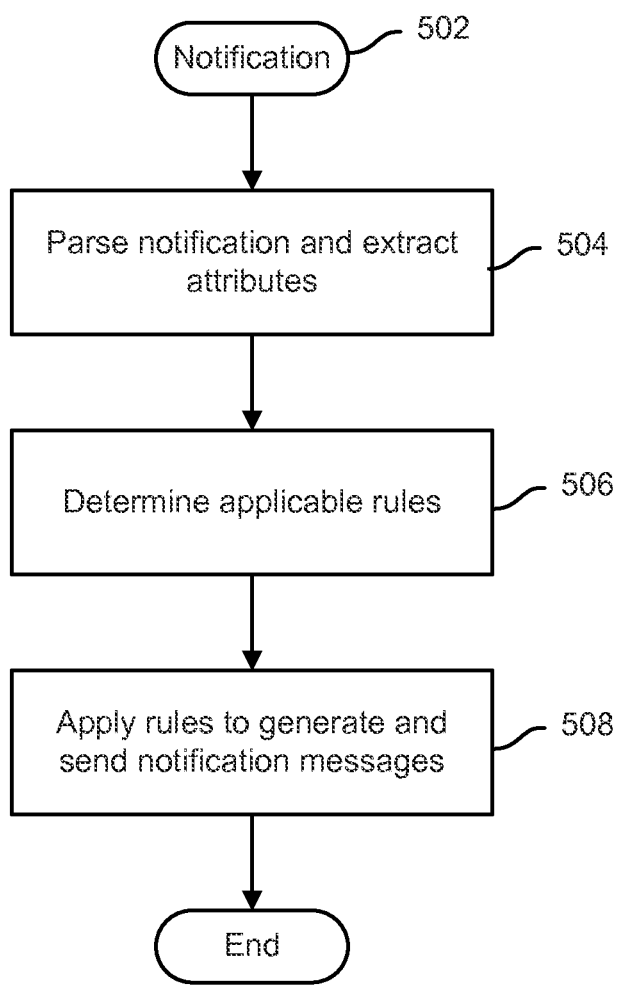
FIG. 5 is a flow chart illustrating an embodiment of a process to provide rule-based notifications.

FIG. 5 is a flow chart illustrating an embodiment of a process to provide rule-based notifications. In various embodiments, the process of FIG. 5 may be implemented by or on a notification center, such as notification center 202 of FIG. 2. In the example shown, on receiving a notification message (502), for example by email or via an API or other interface, the notification center parses the notification and extracts attribute data (504). In some embodiments, the attributes to be extracted are included in a rule definition. Rules that may be applicable to the received notification are determined programmatically (506), for example based on one or more attributes extracted from the notification and/or a source of the notification and/or a user with which the notification is associated, and the applicable rules are applied to generate and send to recipient users, via indicated channels, corresponding notification messages (508).

Figure 6:
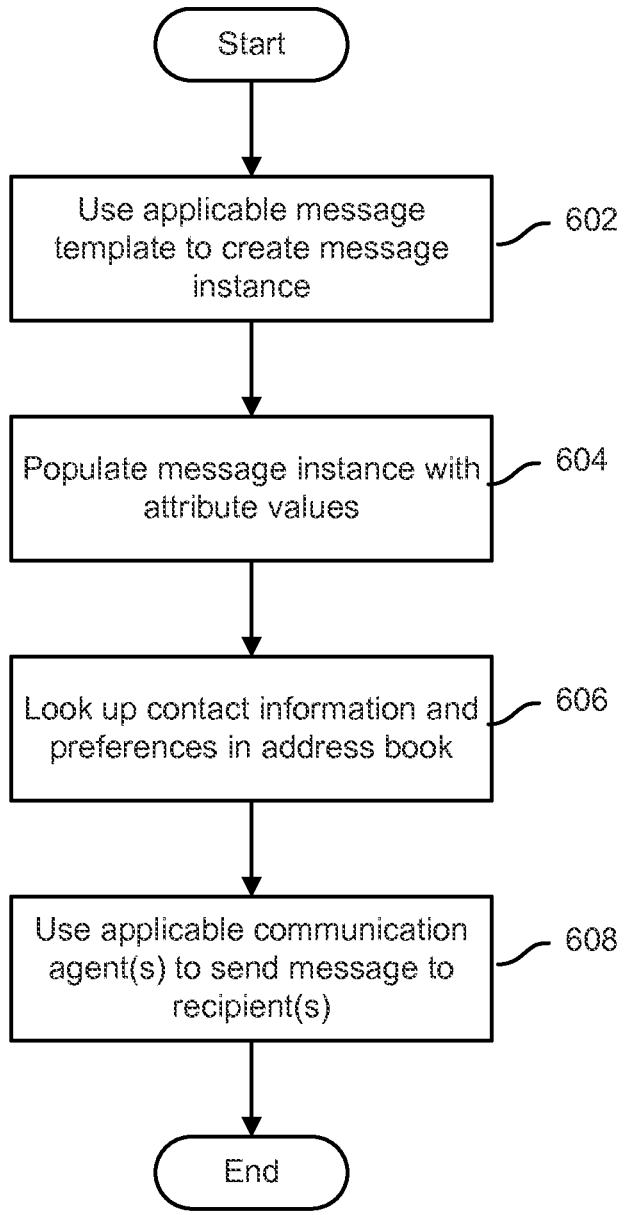
FIG. 6 is a flow chart illustrating an embodiment of a process generate a notification message.

FIG. 6 is a flow chart illustrating an embodiment of a process generate a notification message. In some embodiments, the process of FIG. 6 is included in step 508 of FIG. 5. In the example shown, an applicable message template for a required outbound notification is used to create an instance based on the template (602). For example, if a notification is to be sent by email, an instance of a corresponding email template is created. The created instance of the message is populated with one or more attribute values (604), for example attributes extracted and/or derived from an inbound notification received at a notification center. Contact information and/or preferences for intended recipients (e.g., those identified in or determined based on information included in the inbound notification, for example by applying a rule that yields the recipient information) are determined, for example by reading information stored previously at the notification center (606) and used to address the notification appropriately. Applicable communication agent(s) is/are used to send the message to the intended recipient(s) (608). In the case of a machine-to-machine notification, for example, an agent may be used to communicate with a recipient tool and/or system via an API or other interface of that tool or system. Or, in the case of email or other communication channel, an agent or other connector may be used to generate and send the notification via and in compliance with associated protocols.

In various embodiments, use of techniques as disclosed herein enable notifications of actions and information within a software development environment to be generated and sent programmatically, for each intended recipient in a manner (i.e., via a channel) and including content that is most desired by and effective in communicating to that intended recipient. In various embodiments, sending and receiving users are empowered to send/receive notifications in a form and manner they prefer and consider to be the most effective, timely, and appropriate to communicate the most useful information in the most useful way. While certain examples above focus on notifications triggered initial by committing code to a repository, in various embodiments other actions originated by or at other elements of the software development environment, such as completion of testing and submission of test results, manager approval of previously submitted code or other content, successful generation of an installation wizard or tool, etc., may trigger notifications as described herein. In addition, while the software development environments described herein contain certain specified types of tools and/or other elements, in other embodiments more, fewer, other, and/or different elements may be present and/or used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving, at a notification center, a message from a first software development tool indicating that a software development project event has occurred;
    extracting a first attribute value from the message from the first software development tool;
    providing the first attribute value to a rule engine, wherein the rule engine is configured to determine a first communication rule relating to the software development project event, the first communication rule being determined at least in part by the first attribute value, and wherein the first communication rule requires a first action; and
    performing the first action required by the first communication rule, wherein the first action includes:
        identifying in accordance with conditions of the first communication rule a first recipient associated with said software development project for receiving a first notification concerning said software development project event;
        selecting, based on a role of the first recipient in the software development project, one or more communication channels, from a plurality of communication channels, over which said first notification is communicated to the first recipient;
        generating content of said first notification communicated to said first recipient in accordance with the conditions of the first communication rule; and
        sending the first notification to the first recipient over the one or more selected communication channels.

2. The method of claim 1, wherein the generating of the first notification comprises:
    determining said content of the first notification communicated in response to the occurrence of the software development project event based upon the role of the first recipient and a type of the software development project event.

3. The method of claim 1, wherein the software development project event comprises a completion of a software development project related action.

4. The method of claim 3, wherein the software development project related action includes committing software code to a code repository.

5. The method of claim 1, wherein the first software development tool comprises one or more of the following: a code repository, a source code revision control tool; a code review tool, a software development or other project management tool, a test case management tool, and a release engineering tool.

6. The method of claim 1, wherein generating the first notification comprises using the first attribute value to populate a template associated with the first notification.

7. The method of claim 1, wherein the first recipient comprises a human member of a software development project team.

8. The method of claim 1, wherein the first recipient comprises a second software development tool, a system, or another non-human element associated with the software development project.

9. The method of claim 1, further comprising:
    storing the first communication rule in a rule set.

10. The method of claim 1, further comprising:
    configuring of the one or more software development tools to transmit a message to the notification center whenever a software development project event occurs.

11. The method of claim 1, wherein the notification center is configured to receive messages from a plurality of software development tools that one or more software development project events have occurred.

12. A system, comprising:
    a notification center, comprising:
        a communication interface configured to receive message from a first software development tool indicating that a software development project event has occurred; and
        a processor coupled to the communication interface and configured to:
            extract a first attribute value from the message from the first software development tool;
            provide the first attribute value to a rule engine, wherein the rule engine is configured to determine a first communication rule relating to the software development project event, the first communication rule being determined at least in part by the first attribute value, and wherein the first communication rule requires a first action; and perform the first action required by the first communication rule, wherein the first action includes:

identifying in accordance with conditions of the first communication rule a first recipient associated with said software development project for receiving a first notification concerning said software development project event;

selecting, based on a role of the first recipient in the software development project, one or more communication channels, from a plurality of communication channels, over which said first notification is communicated to the first recipient;

generating content of said first notification communicated to the first recipient in accordance with the conditions of the first communication rule; and sending the first notification to the first recipient over the one or more selected communication channels.

13. The system of claim 12, wherein the generating of the first notification comprises:

determining said content of the first notification communicated in response to the occurrence of the software development project event based upon the role of the first recipient and a type of the software development project event.

14. The system of claim 12, wherein the software development project event comprises a completion of a software development project related action.

15. The system of claim 14, wherein the software development project related action includes committing software code to a code repository.

16. The system of claim 12, wherein the first software development tool comprises one or more of the following: a code repository, a source code revision control tool; a code review tool, a software development or other project management tool, a test case management tool, and a release engineering tool.

17. The system of claim 12, wherein generating the first notification comprises using the first attribute value to populate a template associated with the first notification.

18. The system of claim 12, wherein the first recipient comprises a human member of a software development project team.

19. The system of claim 12, wherein the notification center is configured to receive messages from a plurality of software development tools that one or more software development project events have occurred.

20. A computer program product, the computer program product being embodied in a tangible and non-transitory computer readable storage medium and comprising computer instructions for:

receiving, at a notification center, message from a first software development tool indicating that a software development project event has occurred;

extracting a first attribute value from the message from the first software development tool to extract a first attribute value;

providing the first attribute value to a rule engine, wherein the rule engine is configured to determine a first communication rule relating to the software development project event, the first communication rule being determined at least in part by the first attribute value, and wherein the first communication rule requires a first action; and performing the first action required by the first communication rule, wherein the first action includes:

identifying in accordance with conditions of the first communication rule a first recipient associated with said software development project for receiving a first notification concerning said software development project event;

selecting, based on a role of the first recipient in the software development project, one or more communication channels, from a plurality of communication channels, over which said first notification is communicated to the first recipient;

generating content of said first notification communicated to the first recipient in accordance with the conditions of the first communication rule; and sending the first notification to the first recipient over the one or more selected communication channels.

21. The method of claim 1, wherein the notification center comprises a pluggable communication channel architecture via which communication channels can be configured for the notification center to send a notification message.

* * * * *